3,356,855
PARALLEL OPERATING VOLTAGE STABILIZED
POWER SUPPLY ARRANGEMENT
Akira Suzuki and Norio Muto, Tokyo, Japan, assignors to Nippon Electric Company, Limited, Tokyo, Japan, a corporation of Japan
Filed Oct. 18, 1963, Ser. No. 317,229
Claims priority, application Japan, Nov. 8, 1962, 37/50,362
6 Claims. (Cl. 307—53)

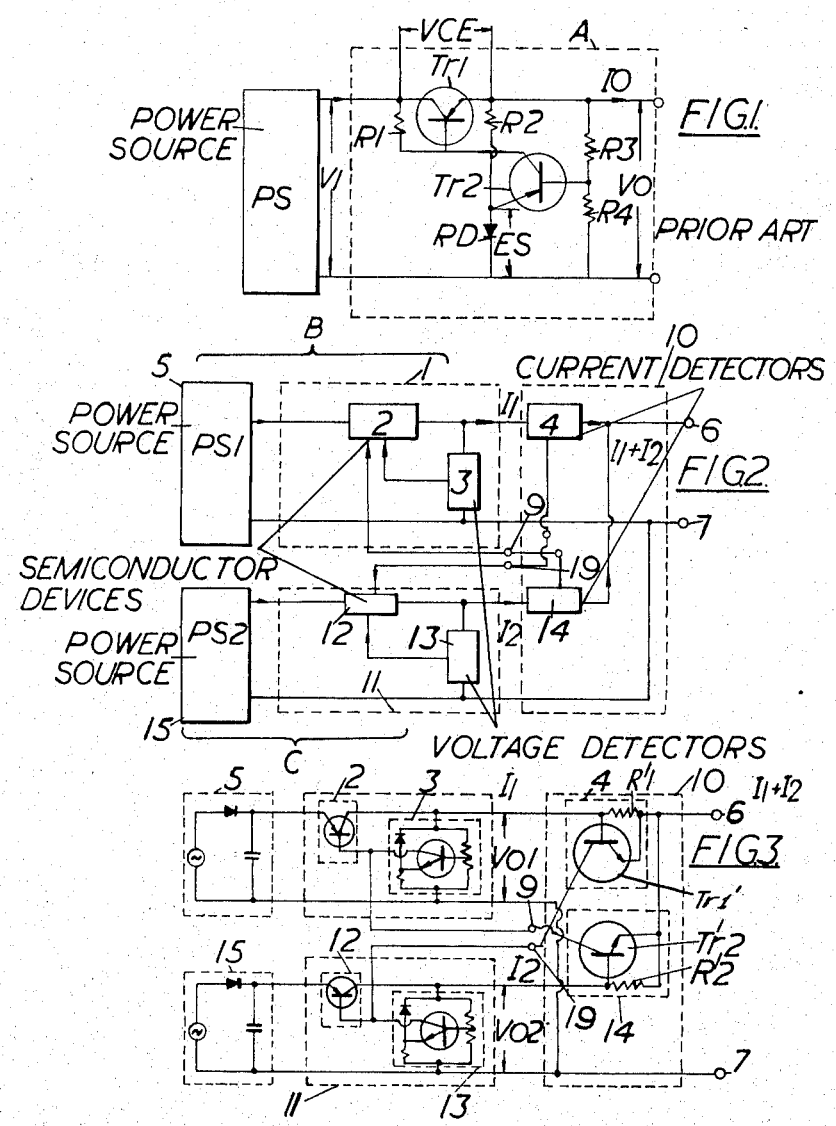

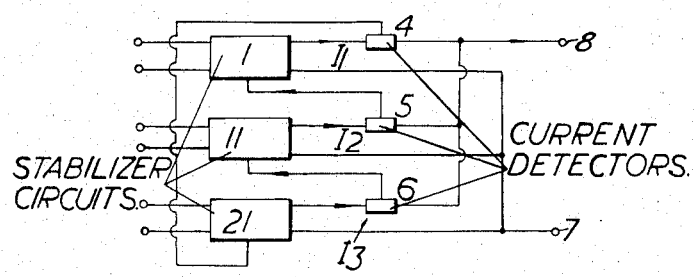
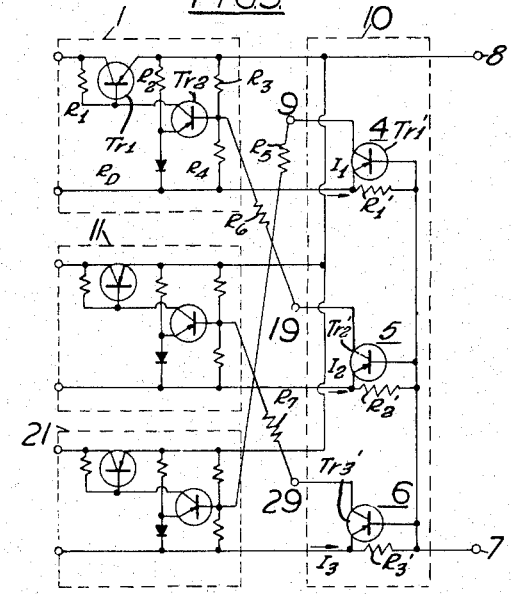

This invention relates to a parallel operating voltage stabilized power supply arrangement and more particularly to an arrangement of the kind which comprises a control device for equalizing load factors of a plurality of transistorized constant-voltage power supply units under parallel operation whose maximum load currents are not necessarily equal. The invention is adapted to a series or parallel controlling transistorized stabilized power supply or a phase-controlled stabilized power supply using controlled rectifiers.

It is an object of the invention to provide a parallel operating voltage stabilized power supply arrangement having control circuit for equalizing load factors of the power supply units.

Other objects, features and advantages of the present invention will become apparent as the description of an illustrative embodiment thereof proceeds when considered in connection with the accompanying drawings in which;

FIG. 1 is a circuit of a conventional series-controlling transistorized constant-voltage power supply unit;

FIG. 2 is a block diagram of the present invention embodied in parallel operation of two power supply units;

FIG. 3 is a circuit diagram of the embodiment shown in FIG. 2, and

FIGS. 4 and 5 are block and circuit diagrams, respectively, of the present invention embodied in the parallel operation of three power supply units.

Referring to the drawings, a typical circuit diagram of the conventional series-controlling transistorized stabilized power supply unit is shown in FIG. 1, in which PS is a rectified power source, and a voltage-stabilizing circuit A shown in a box encircled by dotted line is connected thereto. In FIG. 1, $Tr_1$ is series-controlling transistor, RD is a constant-voltage diode such as Zener diode for providing reference voltage $Es$. $Tr_2$ is a transistor for detecting and amplifying the fluctuation of the output voltage. The function of the circuit will be made apparent by following description. Assuming that the output voltage $V_1$ of the power source is increased, the output voltage $Vo$ of the stabilizer will also be increased, consequently increasing the base voltage of transistor $Tr_2$ supplied from a voltage divider comprising resistors $R_3$ and $R_4$ connected in series between the stabilizer output terminals, thus changing the base voltage proportionally to the fluctuation of the stabilizer output voltage $Vo$. On the other hand the emitter voltage is stabilized by means of the constant-voltage diode RD and set to $Es$. Consequently, the base current of $Tr_2$ will be increased when the base voltage is increased as described above, resulting in the increase of the collector current by a rate of grounded emitter current amplification factor $h_{FE2}$. Therefore, assuming that the base current of $Tr_1$ is less than the collector current of $Tr_2$, the voltage drop across a collector load resistor $R_1$ will be increased proportionally to the increase of the collector current of the $Tr_2$, decreasing the base-emitter voltage of $Tr_1$, so that the base current and the collector current of $Tr_1$ are reduced. This results in the decrease of the output voltage $Vo$ because of the increase of the internal resistance between emitter and collector of the transistor $Tr_1$, suppressing the increase of $Vo$. On the contrary, when $Vo$ is decreased, the internal resistance of the $Tr_1$ will be decreased, and the decrease of $Vo$ will be suppressed.

In case of the series controlling transistorized stabilized power supply unit, the power dissipated in the collector of the series controlled transistor should be smaller than the maximum power dissipation $P_{Cmax}$ thereof. In most cases, collector-emitter voltage $V_{CE}$ may be selected to be greater than the sum of variation $\Delta V_1$ in $V_1$ and collector saturation voltage $V_{CES1}$ of $Tr_1$. Therefore, the maximum output current $I_0$ will be limited to the value of $P_{Cmax}/V_{CE}$. If the required current of a stabilized power supply unit, using semiconductor devices, exceeds the maximum current of the controlling semiconductor used, the conventional resolution has been parallel operation of several controlling semiconductor devices.

In parallel operation of circuits of the above-mentioned type, however, one must consider that there is unbalance of loading among the parallel connected semiconductor devices because of the differences in characteristics of devices. The total allowable power dissipation of the devices should be large enough to allow the continuous operation by virtue of the remaining transistors, even in the case of damage of any transistor. Consequently the total current capacity of $n$ parallel operating controlling semiconductor devices is not always equal to the product of the current of one device and $n$. Therefore, the factor of utilization of the semiconductor devices becomes lower and the cost of the unit may be raised. For the above reasons, the upper limit of available current of a conventional practical power supply unit has been only several scores of amperes.

The present invention makes it possible to operate the conventional constant-voltage stabilized power supply units having the capacity of several scores of amperes in parallel operation with equal load factor without difficulty.

The invention will become clear by the following description made with reference to FIG. 2, wherein an embodiment for parallel operation of two power supply units is shown. In FIG. 2, there are two rectified power sources 5 and 15, stabilizing circuits 1 and 11 (shown within rectangular dotted lines) both of which have the same construction and equal power capacity. The stabilizers comprise series-controlling semiconductor devices 2 and 12 and output voltage fluctuation detectors 3 and 13, respectively, whose practical circuitry may be as shown in FIG. 1. The stabilized power supply units B and C, which comprise 5 and 1, and 15 and 11, respectively, are constructed as constant-voltage devices, so that the output impedance of the power supply units may be very low. Consequently, there is a possibility of breakdown of either of the power supply units B and C, operating in parallel with commonly connected output terminals 6 and 7, if there are differences between the output voltages and the stabilizing circuits, so that the load is shared by one stabilizing circuit having a little higher output voltage.

According to the invention, a controlling circuit 10 is connected to the stabilized power supply units B and C for equalizing their load current and thus allowing the maximum load current to be derived. The controlling circuit 10 includes detecting circuits 4 and 14; their controlling output terminals 9 and 19 are respectively connected in an interchanging manner to the series-controlling semiconductor elements 2 and 12. The output terminals of the parallel connected power supply units are shown as 6 and 7.

Now, for the convenience of the following explanation, let us make assumption that the voltage of the power supply B has risen higher than that of the power supply C, and that the load current $I_1$ of the power supply B is larger than the current $I_2$ of the power supply C.

The current detector 4 detects the increase of $I_1$, and its controlling output is supplied to the control system of the power supply C, decreasing the internal resistance of the series-controlling semiconductor device 12 and thus increasing the load current $I_2$ of the power supply C. Therefore, if the total load current is constant, $I_1$ will decrease as much as the increase in $I_2$, and consequently, $I_1$ and $I_2$ may be maintained at a substantially equal load factor. The ratio of $I_1$ to $I_2$ can be set by adjustment of the sensitivity of detectors 4 and 14 in FIG. 2.

FIG. 3 shows a detailed circuit diagram of the embodiment shown in FIG. 2 and in which the corresponding parts to those of FIG. 2 are similarly numbered for convenience of illustration. In the load current detecting circuit 4, the voltage drop across a resistance $R_1'$ connected in series with the load, is applied between the base and emitter of an NPN detector transistor $Tr_1'$. Since the polarity of the voltage across $R_1'$ is in a forward direction for $Tr_1'$, the collector current of $Tr_1'$ will vary corresponding to the variation of the load current $I_1$ of the power supply B. The collector current may be applied from terminal 19 to the base of series-controlling PNP transistor 12 in the other stabilizing circuit 11 as a controlling signal. Assuming that the output voltage $Vo_1$ of the stabilizing circuit 1 is higher than the voltage $Vo_2$ of the circuit 11, $I_1$ shows a tendency to increase beyond $I_2$. The collector current of the transistor $Tr_1'$ will increase corresponding to the increase of the voltage across $R_1'$, causing the base current of transistor 12 to increase. Accordingly, the internal resistance of transistor 12 decreases, and $Vo_2$ and $I_2$ increase. If $I_2$ increases excessively, the transistor $Tr_2'$ in the circuit 14 operates to increase $I_1$ in the same manner as the case of $Tr_1'$. Thus if the load connected to the output terminals 6 and 7 is constant, the total load current $I_1+I_2$ is kept at a constant value and attains the predetermined ratio of $I_1$ to $I_2$.

In the case of the circuit shown in FIG. 3, since the current capacities of the stabilizing circuits 1 and 11 are equal, the ratio of $I_1$ to $I_2$ is one, when the resistances of $R_1'$ and $R_2'$ are equal, and the characteristics of the transistors $Tr_1'$ and $Tr_2'$ are identical. If the maximum output current ratio of stabilizing circuits 1 and 11 is $n$, the total current of maximum output currents from both the circuits is available by setting the ratio of $R_1'$ to $R_2'$ in the detecting circuits 4 and 14 at $1/n$, in the case of parallel operation shown in FIG. 3.

FIG. 4 shows a block diagram of controlling circuit for parallel operation of three stabilized power supplies, in which one of the output terminals in each of the constant-voltage power supplies 1, 11 and 21 having the same polarity, are connected to the common load terminals 7 and 8, while the output of each of the load current detecting circuits 4, 5 and 6 is connected to the controlling circuits in such a manner that one of the outputs is connected to a controlling circuit belonging to a neighboring power supply. Now assuming that the load current $I_1$ of power supply 1 has increased, further increase of $I_1$ may be prevented by increasing of the load current $I_3$ of the power supply 21 by control energy from output of the detecting circuit 4 for $I_1$. If $I_3$ has increased excessively, then the $I_2$ of the power supply 11 will be increased in a similar manner described above, with the result that currents $I_1$, $I_2$ and $I_3$ are maintained at a balanced value.

FIG. 5 shows a circuit of the embodiment of the present invention as applied to a series-controlling transistorized power supply. The stabilizer circuits 1, 11 and 21 of FIGURE 5 are substantially identical to that circuit A shown in FIGURE 1 and the resistors, transistors and diode of this circuit have been designated with identical numerals. The operation of this circuit is the same as that described for FIGURE 1. The circuits 11 and 21 are substantially identical to that of FIGURE 1 as well. Each of the current detectors 4, 5 and 6 are comprised of a transistor $Tr_1'$–$Tr_3'$ and an emitter to base resistors $R_1'$–$R_3'$, respectively. These current detector circuits 4, 5 and 6 are substantially identical to the detector circuits 4 and 14 previously described with respect to FIGURE 3. The collector electrodes of each of the transistors $Tr_1'$–$Tr_3'$ are coupled through resistors $R_5$–$R_7$ respectively, to the base electrodes of the parallel connected transistors in each of the circuits 1, 11 and 21 such as, for example, the transistor $Tr_2$ shown in circuit 1 of FIGURE 5. If, for example, the current $I_1$ flowing through the first current detector 4 deviates from its normal value the IR drop across resistor $R_1'$ will change altering the emitter-base voltage of transistor $Tr_1'$. This will alter the current in the collector circuit of this transistor, which current is fed to the base of transistor $Tr_2$ in circuit 21 so as to increase the current $I_3$ due to a corresponding drop in current $I_1$ or conversely, to decrease the current $I_3$ due to a corresponding increase in the current $I_1$. The remaining current detectors operate in a similar fashion. Generally, according to the invention, since power supplies as many as $n$ can be connected in parallel by means of detecting circuit for detecting the load current $I_m$ of the $m$th power supply and for increasing or decreasing the current $I_{m+1}$ of the other $(m+1)$th power supply, for instance, so as to make all of the load current $I_1, I_2, \ldots Im \ldots In$ to be equal to one another, large currents of as many as several hundred amperes can be easily derived by operating a number of conventional power supplies in parallel.

While the description was made with the series-controlling transistorized circuit, it will be apparent that the invention is not only applicable to a parallel-controlling transistorized circuit but also to a phase-controlling system employing a controlled rectifier device. If the current detecting circuits 4 and 14 in FIG. 2 are inserted ahead of the input side of the detecting circuits 3 and 13, a voltage drop of the output caused by the circuits 4 and 14 will be eliminated by function of the voltage stabilizing action of circuits 3 and 13.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. In a regulated power supply system comprising a plurality of separate power supply units each having a power source and a series-connected regulating transistor, a shunt-connected voltage divider and a control transistor connected to said voltage divider and said regulating transistor to provide voltage regulation of the respective unit; and connections for connecting said power supply units in parallel to a common load, an arrangement for assuring a proportional division of said load among said units, comprising a voltage dropping resistor in series in with said regulating transistor in each unit, a transistor having control electrodes connected across each said regulating resistor, and an output electrode connected to control the impedance of a regulating transistor in a different one of said units.

2. A system according to claim 1 wherein said output electrode is directly connected to a control electrode of said regulating transistor of the different said unit.

3. A system according to claim 1 wherein said output electrode is directly connected to a control electrode of said control transistor.

4. A circuit for stabilizing the division of a load among power supplies connected in parallel to said load, comprising a first controllable semiconductor device in series with a lead from each of said power supplies, a shunt-connected semiconductor device in each said power supply for controlling said first device, a third semiconductor device, for detecting current flowing in the individual output of each power supply, and connections from said third semiconductor devices to respectively different ones of said power supply source controllable semiconductor devices to stabilize the division of said load among them.

5. Stabilizing means for plural power supplies comprising
- a plurality of power supplies;
- a stabilizing circuit for each power supply comprising:
  - a first transistor having three electrodes connected in series with one output terminal of an associated power supply;
  - a second transistor having three electrodes and being connected in parallel across the output terminals of an associated power supply;
  - a voltage divider circuit connected and coupled to one electrode of said second transistor in parallel across the output terminals of an associated power supply for controlling the conduction of said second transistor;
  - a reference voltage branch circuit connected in parallel with the output terminals of an associated power supply and connected to a second electrode of said second transistor for establishing a reference voltage at said second electrode;
  - the third electrode of said second transistor being coupled to one electrode of said first transistor for regulating conduction therethrough with changes in the power supply output voltage appearing across the output terminals of the associated power supply;
- a plurality of current detectors for each of said power supplies each comprising:
  - a resistor connected in series with one output terminal of an associated power supply;
  - a third transistor having three electrodes, two electrodes of said third transistor being coupled across said resistor;
  - the third electrode of said third transistor being coupled to one electrode of one of said first and second transistors which are coupled to a power supply other than the one associated with said current detector for adjusting its output current to the power supply to compensate for changes in output current of the power supply associated with said current detector.

6. An arrangement for parallel operation of at least two power supply units, each having voltage stabilizing means including at least one semiconductor device and further having means in each power supply unit coupled to said voltage stabilizing means for controlling the output current magnitude of its associated power supply unit, the improvement comprising means in each of said units, for detecting a variation of the partial load current of its associated unit; and means in each power supply unit coupled to said detecting means for supplying the detected variation in the form of a control signal to the current controlling means of the other one of said power supply units to adjust the partial load current of the last mentioned unit at a predetermined rate in order to compensate for changes in output current of the power supply output current having a detected variation; whereby the total load current supplied by said power supply units is maintained substantially constant.

References Cited

UNITED STATES PATENTS

| | | | |
|---|---|---|---|
| 3,001,082 | 9/1961 | Clarke | 307—53 X |
| 3,059,121 | 10/1962 | Masters | 307—54 |
| 3,185,856 | 5/1965 | Harrison | 307—55 |

ORIS L. RADER, *Primary Examiner.*

T. J. MADDEN, *Assistant Examiner.*